(12) United States Patent
Liao et al.

(10) Patent No.: US 10,944,439 B2
(45) Date of Patent: Mar. 9, 2021

(54) RECYCLABLE LOGISTICS APPARATUS AND METHOD AND SYSTEM FOR PROCESSING EMPTY AND FULL SIGNALS THEREOF

(71) Applicant: SHANGHAI HONGYAN RETURNABLE TRANSIT PACKAGINGS CO., LTD., Shanghai (CN)

(72) Inventors: Qingxin Liao, Shanghai (CN); Yiwen Cao, Shanghai (CN); Chunjiang Ye, Shanghai (CN)

(73) Assignee: SHANGHAI HONGYAN RETURNABLE TRANSIT PACKAGINGS CO., LTD., Shanghai (CN)

( * ) Notice: Subject to any disclaimer, the term of this patent is extended or adjusted under 35 U.S.C. 154(b) by 43 days.

(21) Appl. No.: 15/566,609

(22) PCT Filed: Apr. 12, 2016

(86) PCT No.: PCT/CN2016/079070
§ 371 (c)(1),
(2) Date: Oct. 13, 2017

(87) PCT Pub. No.: WO2016/165609
PCT Pub. Date: Oct. 20, 2016

(65) Prior Publication Data
US 2018/0102795 A1    Apr. 12, 2018

(30) Foreign Application Priority Data

Apr. 14, 2015 (CN) .......................... 201510174159.X (51) Int. Cl.
*H04B 1/034* (2006.01)
*G06Q 10/08* (2012.01)
*H04W 4/80* (2018.01)
*G06K 17/00* (2006.01)
(Continued)

(52) U.S. Cl.
CPC ............. *H04B 1/034* (2013.01); *G06Q 10/08* (2013.01); *G06K 17/0022* (2013.01);
(Continued)

(58) Field of Classification Search
CPC ........ H04B 1/034; G06Q 10/08; G06Q 10/30; G06Q 50/28; Y02W 90/20; H04W 4/80; G06K 17/0022; B65D 1/22–5/448
See application file for complete search history.

(56) References Cited

U.S. PATENT DOCUMENTS 4,614,266 A * 9/1986 Moorhead .............. B65D 79/00
206/216
4,807,672 A    2/1989 Sherk et al.
(Continued)

FOREIGN PATENT DOCUMENTS

| CN | 1823493 | 8/2006 |
|----|---------|--------|
| CN | 201268494 | 7/2009 |

(Continued)

OTHER PUBLICATIONS

International Search Report for international application No. PCT/CN2016/079070, dated Jul. 12, 2016 (4 pages, including English translation).
(Continued)

*Primary Examiner* — Yuwen Pan
*Assistant Examiner* — Angelica M Perez
(74) *Attorney, Agent, or Firm* — Hamre, Schumann, Mueller & Larson, P.C.

(57) ABSTRACT

A recyclable logistics apparatus which can provide empty and full signals and a method for processing the empty and full signals, belong to the logistics field. The recyclable logistics apparatus at least comprises a bottom (1), a top cover (2), a foldable side panel (3) and a wireless beacon unit (4) for transmitting a broadcast frame outwards; a
(Continued)

(a)

(b)

trigger switch (5) is provided on the bottom (1), the top cover (2) or the side panel (3); when the side panel (3) of the recyclable logistics apparatus is folded, the trigger switch (5) is in a first trigger state and generates a first electrical signal, and the wireless beacon unit (4) transmits an empty signal outwards according to the first electrical signal; when the side panel (3) of the recyclable logistics apparatus is upright, the trigger switch (5) is in a second trigger state and generates a second electrical signal, and the wireless beacon unit (4) transmits a full signal outwards according to the second electrical signal. As respective recyclable logistics apparatus is changed to the folded state and the upright state, an empty signal and a full signal are generated correspondingly and automatically, which significantly reduces the workload and time for performing statistics about using states of recyclable logistics apparatuses.

8 Claims, 7 Drawing Sheets

(51) Int. Cl.
*G06Q 10/00* (2012.01)
*G06Q 50/28* (2012.01)

(52) U.S. Cl.
CPC ............ *G06Q 10/30* (2013.01); *G06Q 50/28* (2013.01); *H04W 4/80* (2018.02); *Y02W 90/00* (2015.05)

(56) References Cited

U.S. PATENT DOCUMENTS

| | | | | |
|---|---|---|---|---|
| 5,549,073 | A * | 8/1996 | Askins | A01K 1/032 |
| | | | | 119/461 |
| 6,104,306 | A * | 8/2000 | Hogue | B42D 15/022 |
| | | | | 200/332 |
| 7,600,336 | B2 * | 10/2009 | Hermanson | B42D 15/022 |
| | | | | 40/427 |
| 8,720,690 | B2 * | 5/2014 | Ruggiero | B65D 85/00 |
| | | | | 206/459.1 |
| 9,661,409 | B2 * | 5/2017 | Leach | H04R 1/028 |
| 2004/0111930 | A1 * | 6/2004 | Ossmann | G09F 1/06 |
| | | | | 40/124.14 |
| 2006/0069588 | A1 * | 3/2006 | Ritter | G06Q 10/30 |
| | | | | 705/39 |
| 2007/0124020 | A1 * | 5/2007 | Staples | G06Q 10/08 |
| | | | | 700/229 |
| 2013/0001223 | A1 * | 1/2013 | Cavalcante | B65D 11/1833 |
| | | | | 220/4.01 |
| 2014/0158752 | A1 * | 6/2014 | Anton Lopez | B65D 5/725 |
| | | | | 229/120.01 |
| 2015/0114959 | A1 * | 4/2015 | Fritz | B62B 1/12 |
| | | | | 220/7 |

FOREIGN PATENT DOCUMENTS

| | | |
|---|---|---|
| CN | 202027366 | 11/2011 |
| CN | 102844801 | 12/2012 |
| CN | 102975901 | 3/2013 |
| CN | 104376443 | 2/2015 |
| CN | 104399677 | 3/2015 |
| CN | 104410438 | 3/2015 |
| CN | 204206180 | 3/2015 |
| CN | 104835023 | 8/2015 |
| GB | 2508209 A | 5/2014 |

OTHER PUBLICATIONS

Extended European Search Report; European Patent Application No. 16779584.8, dated Aug. 9, 2018 (7 pages).

* cited by examiner

RECYCLABLE LOGISTICS APPARATUS AND METHOD AND SYSTEM FOR PROCESSING EMPTY AND FULL SIGNALS THEREOF

FIELD OF THE INVENTION

The present invention relates to the logistics field, particularly relates to recyclable logistics apparatus which can provide empty and full signals and method and system for processing empty and full signals thereof.

BACKGROUND OF THE INVENTION

In the logistics field, it may often track recyclable logistics apparatus. RFID (radio frequency identification devices) technology is common means for tracking cargos/apparatuses which is implemented in the intelligent logistics field, especially active RFID has good effect of tracking devices/apparatuses at medium distance. In addition, recyclable logistics apparatus may also be based on iBeacon technology instead of RFID, and iBeacon protocol is a protocol developed by Apple Company which performs a very accurate micro-positioning through low-power Bluetooth (BLE), and begins to be supported from IOS7.0 and Android 4.3. Through this technology, an equipment may receive a certain range of signals transmitted by other iBeacons, meanwhile may also transmit its own information to other users in a certain range.

The above wireless identification technologies are key and focus for intelligent management of logistics apparatus. However, it can only implement detecting empty and full states of recyclable logistics apparatus by means of visual observing and recording, when current wireless identification technologies are utilized for detection. Thus, the efficiency is low, and the using state of recyclable logistics apparatus cannot be reflected in time and is easy to miss. And the workload and time cost for performing statistics about using states of recyclables logistics apparatuses are high, which is not convenient for a management center to deploy and manage.

SUMMARY OF THE INVENTION

The purpose of the present invention is to provide a recyclable logistics apparatus which can provide empty and full signals and a method for processing the empty and full signals thereof, folded and upright states of recyclable logistics apparatus may generate an empty signal and a full signal correspondingly which may reflect empty and full states of respective recyclable logistics apparatuses accurately and in batch, thereby significantly reducing the workload and time for performing statistics about using states of recyclable logistics apparatuses, and a mobile terminal uploads information of respective logistics apparatuses such that it is convenient for a management center to deploy and manage.

In order to solve the above technical problem, one embodiment of the present invention discloses a recyclable logistics apparatus providing empty and full signals, the recyclable logistics apparatus at least comprises a bottom, a top cover, a side panel which is connected to the bottom and foldable, and a wireless beacon unit for transmitting a broadcast frame outwards;

a trigger switch is provided on the bottom, the top cover or the side panel;

when the side panel of the recyclable logistics apparatus is folded, the trigger switch is in a first trigger state and generates a first electrical signal, and the wireless beacon unit transmits the broadcast frame including a unique identification code of the wireless beacon unit and an empty signal outwards according to the first electrical signal; and when the side panel of the recyclable logistics apparatus is upright, the trigger switch is in a second trigger state and generates a second electrical signal, and the wireless beacon unit transmits the broadcast frame including the unique identification code of the wireless beacon unit and a full signal outwards according to the second electrical signal.

Another embodiment of the present invention discloses a method for processing empty and full signals of recyclable logistics apparatus which comprises:

receiving by a mobile terminal, a broadcast frame wirelessly transmitted by a recyclable logistics apparatus, wherein the broadcast frame at least includes a unique identification code of the recyclable logistics apparatus and a full signal or an empty signal correspondingly generated by the recyclable logistics apparatus;

uploading by the mobile terminal, the unique identification code and corresponding full signal or corresponding empty signal to a server.

Another embodiment of the present invention further discloses a system for processing empty and full signals of recyclable logistics apparatus which comprises:

a receiving unit configured to control a mobile terminal to receive a broadcast frame wirelessly transmitted by a recyclable logistics apparatus, wherein the broadcast frame at least includes a unique identification code of the recyclable logistics apparatus and a full signal or an empty signal correspondingly generated by the recyclable logistics apparatus;

an uploading unit configured to control the mobile terminal to upload the unique identification code and corresponding full signal or corresponding empty signal to a server.

Comparing the embodiments of this invention with prior arts, the main distinctions and their effects are:

As respective recyclable logistics apparatus is changed to the folded state and the upright state, an empty signal and a full signal are generated correspondingly and automatically, which significantly reduces the workload and time for performing statistics about using states of recyclable logistics apparatuses.

It may reflect empty and full states of respective recyclable logistics apparatuses accurately and in batch, and facilitate uploading information of respective logistics apparatuses by a mobile terminal, such that it is convenient for a management center to deploy and manage Further, the state of the trigger switch is sensed by a wire loop, and on and off states of the wire loop are different when the side panel is folded and upright, which correspondingly trigger the wireless beacon unit to generate an accurate empty signal and an accurate full signal.

Further, the broadcast frame received by the mobile terminal further includes a signal of the type of the recyclable logistics apparatus, which facilitates a user to obtain the empty and full states of the desired type of apparatuses at a mobile terminal

DETAILED DESCRIPTION OF THE PREFERRED EMBODIMENTS

In the following description, many technical details are provided for readers to better understand the present application. However, it is understood by those ordinary skilled in the art that the technical solution claimed to be protected by those claims of the present application can also be realized even without these technical details and not based on various changes and modifications of the following embodiments.

For the purpose, technical solution and merits of the present invention to be clearer, the following will further describe the embodiments of the present invention in detail with reference to the accompanying drawings.

Figure 1:
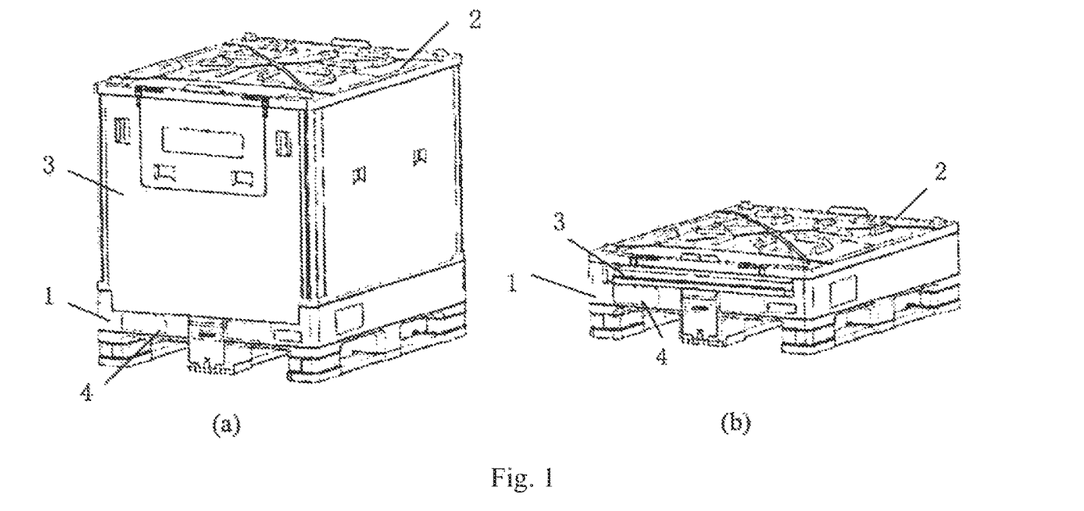
FIG. 1 is a structure schematic diagram of a recyclable logistics apparatus which can provide empty and full signals, according to the first embodiment of the present invention.

The first embodiment of the present invention relates to a recyclable logistics apparatus which can provide empty and full signals. FIG. 1 is a structure schematic diagram of the recyclable logistics apparatus which can provide empty and full signals, wherein FIGS. 1(a) and 1(b) are respectively schematic diagrams of the recyclable logistics apparatus in upright state (full state) and folded state (empty state).

Specifically, as shown in figures, the recyclable logistics apparatus which can provide empty and full signals at least comprises a bottom 1, a top cover 2, side panels 3 which are connected to the bottom and foldable, and a wireless beacon unit 4 for transmitting a broadcast frame outwards.

A trigger switch is provided on the bottom, the top cover or the side panel. It can be understood that the trigger switch may be provided separately on the bottom, the top cover or the side panel, or may be provided on the bottom and the side panel in combination, or may be provided on the top cover and the side panel in combination, or may be provided on adjacent side panels in combination, or may be provided in other forms that can change the trigger switch state according to the upright and folded states of the recyclable logistics apparatus, which can be conceived by those skilled in the art.

As shown in FIG. 1(b), when the side panel of the recyclable logistics apparatus is folded, the trigger switch is in a first trigger state and generates a first electrical signal, and the wireless beacon unit transmits a broadcast frame outwards according to the first electrical signal, the broadcast frame including a unique identification code of the wireless beacon unit and an empty signal.

As shown in FIG. 1(a), when the side panel of the recyclable logistics apparatus is upright, the trigger switch is in a second trigger state and generates a second electrical signal, and the wireless beacon unit transmits a broadcast frame outwards according to the second electrical signal, the broadcast frame including a unique identification code of the wireless beacon unit and a full signal.

Preferably, the wireless beacon unit transmits a broadcast frame by one of the following wireless communication means: RFID, Zigbee, Bluetooth, wifi, iBeacon. The wireless beacon unit is a chip based on the above communication protocol.

In addition, it can be understood that the trigger state of the trigger switch includes opened and closed.

Optionally, when the side panel of the recyclable logistics apparatus is folded, the first trigger state of the trigger switch is that the trigger switch is opened; and when the side panel of the recyclable logistics apparatus is upright, the second trigger state of the trigger switch is that the trigger switch is closed.

In addition, it can be understood that in other embodiments of the present invention, the first trigger state and the second trigger state may also be reversed which does not affect the technical effect, i.e. when the side panel of the recyclable logistics apparatus is folded, the first trigger state which the trigger switch is in is closed, at this moment an empty signal is transmitted; and when the side panel of the recyclable logistics apparatus is upright, the second trigger state which the trigger switch is in is opened, at this moment a full signal is transmitted.

The electrical signal generated by the trigger switch may be a high level signal or a low level signal, wherein the low level signal may be zero voltage. For example, when the trigger switch is opened, a zero voltage might be detected by the wireless beacon unit, the zero voltage also belonging to one of the electrical signals in the embodiments of the present application.

In the present embodiment, as respective recyclable logistics apparatus is changed to the folded state or the upright state, an empty signal or a full signal are generated correspondingly and automatically, which significantly reduces the workload and time for performing statistics about using states of recyclable logistics apparatuses.

The second embodiment of the present invention relates to a recyclable logistics apparatus which can provide empty and full signals. The second embodiment is improved based on the first embodiment, and the main improvement lies in:

the state of the trigger switch is sensed by a wire loop, and on or off states of the wire loop are different when the side panel is folded or upright, which correspondingly trigger the wireless beacon unit to generate an accurate empty signal or an accurate full signal. Specifically:

The recyclable logistics apparatus is further provided with a wire loop, and in the wire loop, the trigger switch is connected to the wireless beacon unit via a wire.

When the side panel of the recyclable logistics apparatus is folded, the first trigger state of the trigger switch causes the wire loop to be in a first state, and the wireless beacon unit generates corresponding empty signal.

When the side panel of the recyclable logistics apparatus is upright, the second trigger state of the trigger switch causes the wire loop to be in a second state, and the wireless beacon unit generates corresponding full signal.

In addition, optionally, when the side panel of the recyclable logistics apparatus is folded, the first state which the wire loop is in is off, and the wireless beacon unit generates an empty signal. When the side panel of the recyclable logistics apparatus is upright, the second state which the wire loop is in is on, and the wireless beacon unit generates a full signal. It can be understood that, in other embodiments of the present invention, the first state and the second state may also be reversed which does not affect the effect of the technical solution.

In the technical solution of the present invention, the trigger state of the trigger switch can be changed with the change of folded state and upright state of recyclable logistics apparatus, and different trigger states trigger the wireless beacon unit to generate a corresponding empty signal and a corresponding full signal. Thus, how to sense the folded state and the upright state of recyclable logistics apparatus is a main point of the trigger switch.

In view of the above main point, preferably the trigger switch includes a metal sheet and a trigger contact point which have corresponding positions.

Figure 2:
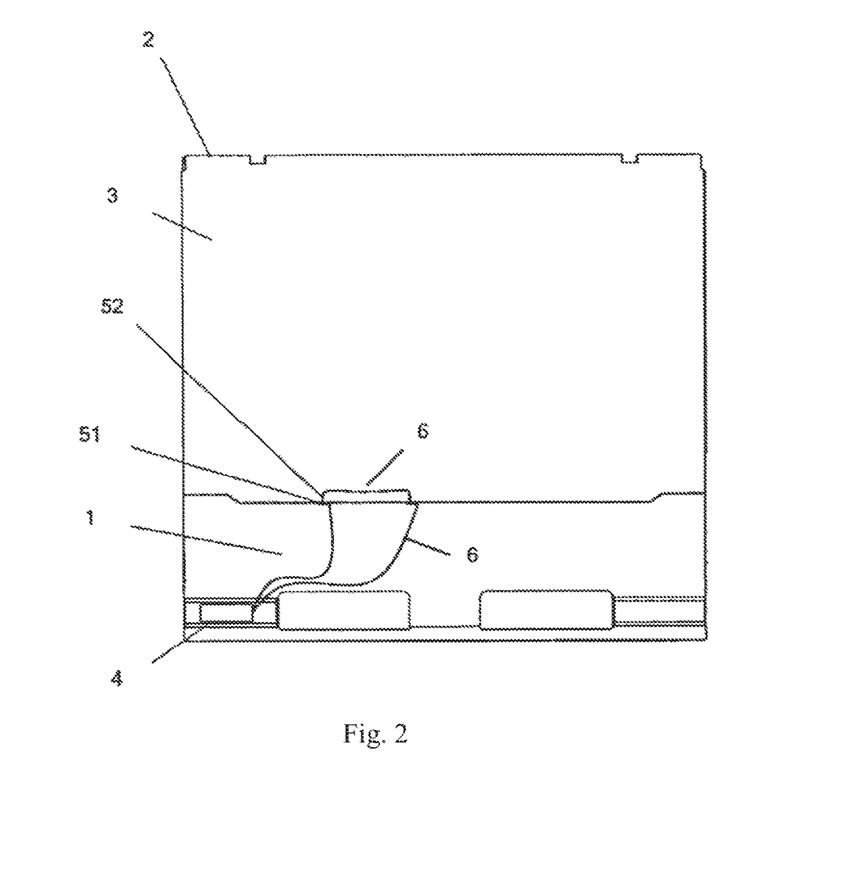
FIG. 2 is a schematic diagram of a recyclable logistics apparatus in upright state, according to the second embodiment of the present invention.
Figure 3:
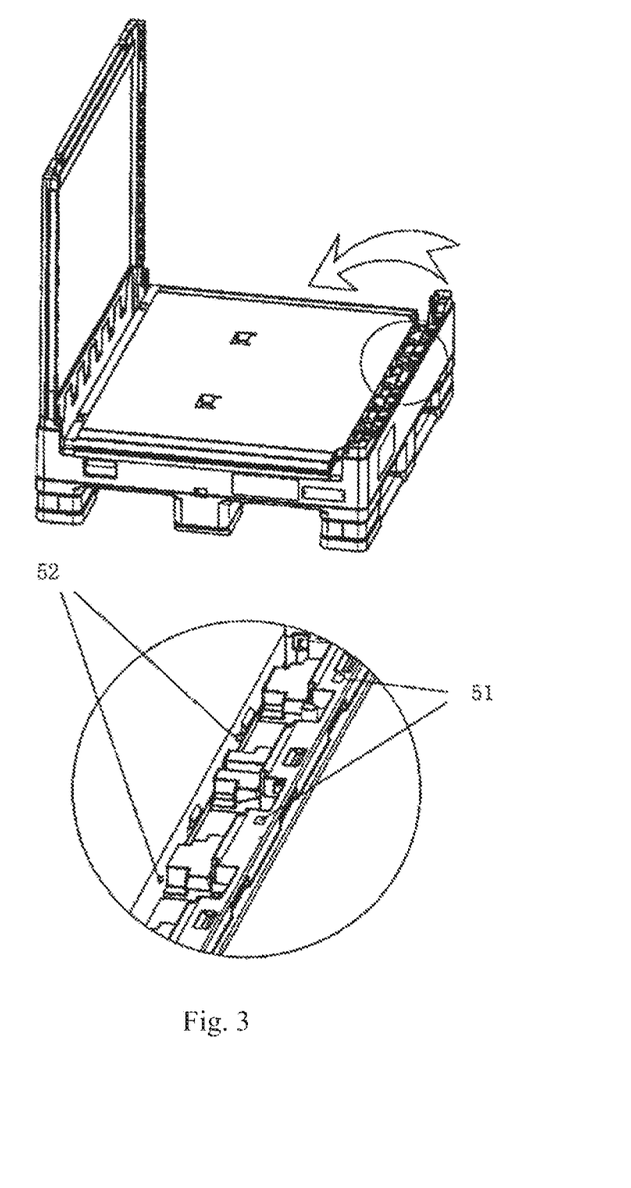
FIG. 3 is a schematic diagram of a recyclable logistics apparatus in folded state, according to the second embodiment of the present invention.

As a preferred example, FIGS. 2 and 3 are respectively schematic diagrams of recyclable logistics apparatus in upright state (full state) and in folded state (empty state).

As shown in FIGS. 2 and 3, the recyclable logistics apparatus at least comprises a bottom 1, a top cover 2, and a side panel 3 which is connected to the bottom and foldable, and a wireless beacon unit 4. A trigger switch 5 is provided on the bottom, the top cover or the side panel, and the trigger switch 5 includes a metal sheet 51 and a trigger contact point 52 which have corresponding positions.

Wherein, the metal sheet 51 is provided on the bottom 1 of the recyclable logistics apparatus and is connected to the wireless beacon unit 4 via a wire 6; the trigger contact point 52 is provided at a position on the side panel 3 of the recyclable logistics apparatus where the trigger contact point can be contacted with the metal sheet on the bottom when the side panel is upright or folded.

As shown in FIG. 2, when the side panel 3 of the recyclable logistics apparatus is upright, the trigger contact point 52 on the side panel is contacted with the metal sheet 51 on the bottom 1 and forms a loop with the chip on the PCB which is the wireless beacon unit 4, such that the container will transmit a full signal; as shown in FIG. 3, when the side panel falls down, the trigger contact point 52 on the side panel is disconnected from the metal sheet 51 on the bottom, and the loop is off, such that the container will transmit an empty signal.

Of course, it can be understood that the above preferred example may also be set to the opposite case by changing the positions of the trigger contact point 52 on the side panel and the metal sheet 51 on the bottom, that is:

When the side panel is folded or falls down, the trigger contact point can be contacted with the metal sheet on the bottom and forms a loop with the chip on the PCB, such that an empty signal is transmitted; when the side panel is upright, the trigger contact point can be disconnected from the metal sheet on the bottom, and the loop is off, such that a full signal is transmitted.

In addition, the metal sheet 51 may also be provided on the side panel 3 of the recyclable logistics apparatus, and the trigger contact point 52 is provided on the bottom panel 1 of the recyclable logistics apparatus, as long as the trigger contact point can be contacted with the metal sheet when the side panel is upright or folded.

In addition, sensing the empty and full states of recyclable logistics apparatus is not limited to the on or off states of the loop, and further includes embedding a pressure sensor or a strain gauge etc in the bottom which reflects the loading condition of the apparatus through the pressure value or the deformation amount of the bottom.

The third embodiment of the present invention relates to a recyclable logistics apparatus which can provide empty and full signals. The third embodiment is an alternative to the second embodiment, in which the trigger switch also includes a metal sheet and a trigger contact point that have corresponding positions, and the distinction only lies in:

In the second embodiment, the metal sheet is provided on the bottom of the recyclable logistics apparatus and is connected to the wireless beacon unit via a wire; the trigger contact point is provided on the side panel of the recyclable logistics apparatus; whereas in the third embodiment, the metal sheet is provided on the top cover of the recyclable logistics apparatus and is connected to the wireless beacon unit via a wire, and the trigger contact point is provided at a position on the side panel of the recyclable logistics apparatus where the trigger contact point can be contacted with the metal sheet when the side panel is upright or folded.

The fourth embodiment of the present invention relates to a recyclable logistics apparatus which can provide empty and full signals. The fourth embodiment is an alternative to the second embodiment, in which the trigger switch also includes a metal sheet and a trigger contact point which have corresponding positions, and the distinction only lies in:

In the second embodiment, the metal sheet is provided on the bottom of the recyclable logistics apparatus and is connected to the wireless beacon unit via a wire; the trigger contact point is provided on the side panel of the recyclable logistics apparatus; whereas in the fourth embodiment, the metal sheet is provided on the side panel of the recyclable logistics apparatus and is connected to the wireless beacon unit via a wire, and the trigger contact point is provided at a position on the same side panel of the recyclable logistics apparatus where the trigger contact point can be contacted with the metal sheet from the side when the side panel is upright or folded.

Figure 4:
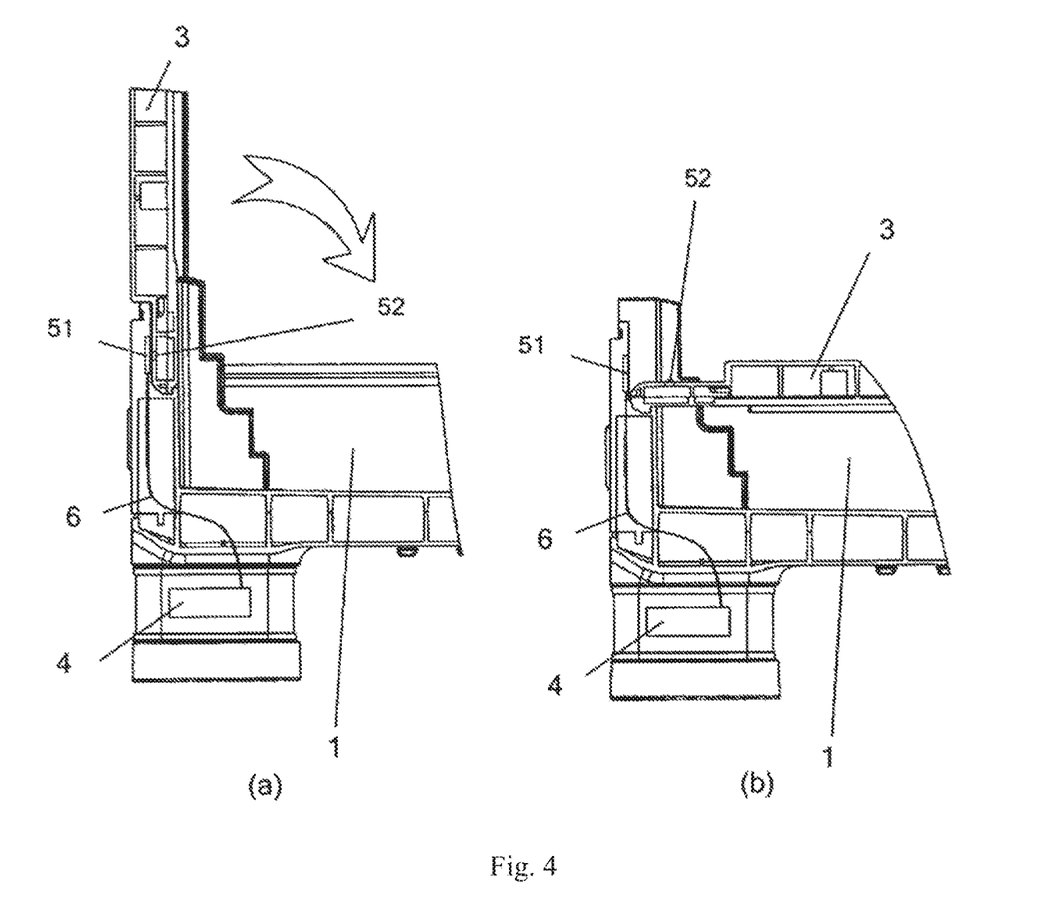
FIG. 4(a) is a schematic diagram of a recyclable logistics apparatus in upright state, according to the fourth embodiment of the present invention.
FIG. 4(b) is a schematic diagram of a recyclable logistics apparatus in folded state, according to the fourth embodiment of the present invention.

As a preferred example, FIGS. 4(*a*) and 4(*b*) are respectively schematic diagrams of recyclable logistics apparatus in upright state (full state) and in folded state (empty state).

As shown in the figures, the metal sheet 51 is provided on the side panel 3 of the recyclable logistics apparatus and is connected to the wireless beacon unit 4 via a wire 6; the trigger contact point 52 is provided at a position on the same side panel of the recyclable logistics apparatus where the trigger contact point can be contacted with the metal sheet from the side when the side panel is upright or folded.

As shown in FIG. 4(a), when the recyclable logistics apparatus is upright, the trigger contact point 52 provided on the side panel is contacted with the metal sheet 51 from the side, so as to form a loop with the chip on the PCB, such that the container will transmit a full signal;

As shown in FIG. 4(b), when the side panel falls down or is folded, the trigger contact point 52 provided on the side panel is disconnected from the metal sheet 51 on the bottom, and the loop is off, such that the container will transmit an empty signal.

Of course, it can be understood that the above preferred example may also be set to the opposite case by changing the positions of the trigger contact point 52 on the side panel and the metal sheet 51 on the bottom, that is:

When the side panel is folded, the trigger contact point can be contacted with the metal sheet on the bottom and forms a loop with the chip on the PCB, such that an empty signal is transmitted; when the side panel is upright, the trigger contact point can be disconnected from the metal sheet on the bottom, and the loop is off, such that a full signal is transmitted.

The fifth embodiment of the present invention relates to a recyclable logistics apparatus which can provide empty and full signals. The fifth embodiment is an alternative to the second embodiment, in which the trigger switch also includes a metal sheet and a trigger contact point that have corresponding positions, and the distinction only lies in:

In the second embodiment, the metal sheet is provided on the bottom of the recyclable logistics apparatus and is connected to the wireless beacon unit via a wire, and the trigger contact point is provided on the side panel of the recyclable logistics apparatus; whereas in the fifth embodiment, the metal sheet and the trigger contact point are provided on adjacent side panels, and the trigger contact point can be contacted with the metal sheet when the side panel is upright or folded.

Figure 5:
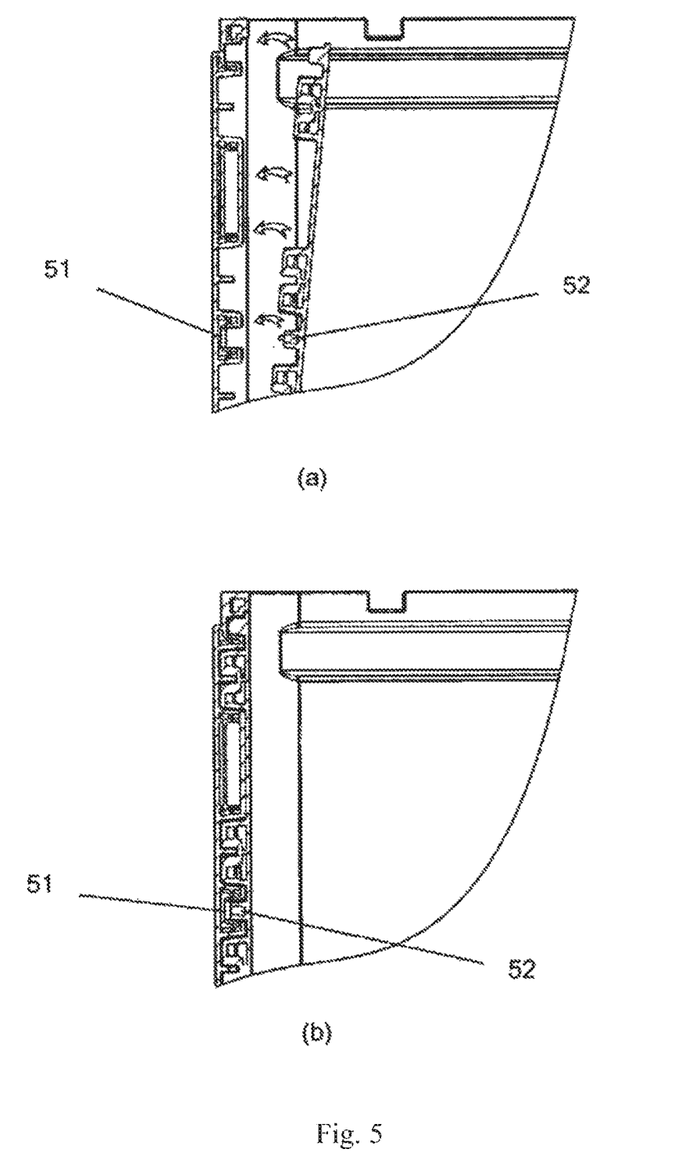
FIG. 5(a) is a schematic diagram of a recyclable logistics apparatus in folded state, according to the fifth embodiment of the present invention.
FIG. 5(b) is a schematic diagram of a recyclable logistics apparatus in upright state, according to the fifth embodiment of the present invention.

As a preferred example, FIGS. 5(a) and 5(b) are respectively schematic diagrams of recyclable logistics apparatus in folded state (empty state) and in upright state (full state).

As shown in the figures, the metal sheet 51 is provided on a first side panel of the recyclable logistics apparatus and is connected to the wireless beacon unit via a wire; the trigger contact point 52 is provided on a second side panel which is adjacent to the first side panel and is located at a position where the trigger contact point can be contacted with the metal sheet when the first side panel and the second side panel are upright or folded, in other words, the metal sheet and the trigger contact point are respectively embedded in adjacent two side panels.

As shown in FIG. 5(a), when the recyclable logistics apparatus is folded, the trigger contact point 52 provided on the side panel is disconnected from the metal sheet 51 on the adjacent side panel, and the loop is off, such that the container will transmit an empty signal;

As shown in FIG. 5(b), when the recyclable logistics apparatus is upright, the trigger contact point 52 is contacted with the metal sheet 51 to form a loop, such that the container will transmit a full signal.

In addition, it can be understood that, in other embodiments of the present invention, the trigger switch may also be other form, not limited to the form of the trigger switch 5 described in the second, third, fourth and fifth embodiments which includes two metal sheets 51 and two trigger contact points 52 that have corresponding positions.

Figure 6:
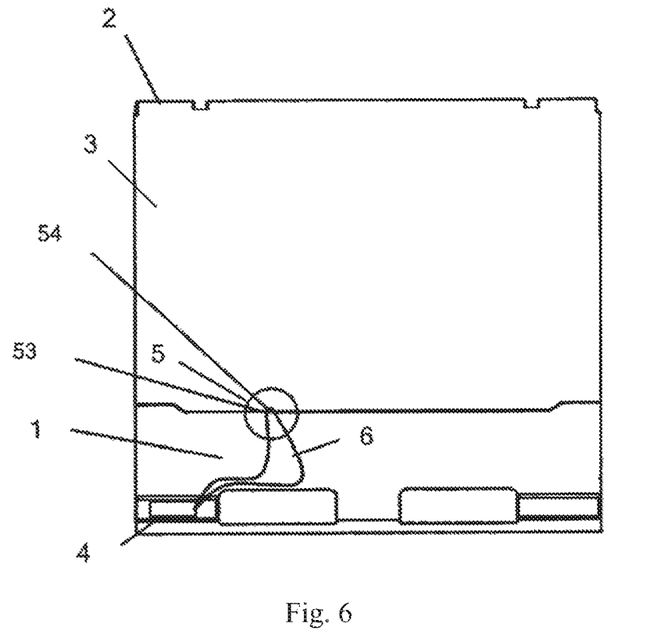
FIG. 6 is a schematic diagram of a recyclable logistics apparatus in upright state, according to the fifth embodiment of the present invention.

For example, the structure of the trigger switch 5 may be shown as FIG. 6, where the trigger switch includes a contact switch 53 and a tablet 54, when the recyclable logistics apparatus is folded, the contact switch 53 is not contacted with the tablet 54, and the loop is off; when the recyclable logistics apparatus is upright, the tablet 54 is pressed downward, such that the contact switch 53 is contacted with the tablet 54 and the loop is on.

In addition, the trigger switch may also be a spring switch, a magnetical switch or an inductive structure etc.

Figure 7:
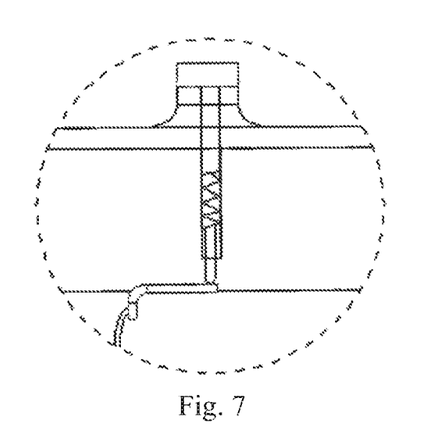
FIG. 7 is an enlarged structure schematic diagram of a spring switch, according to the fifth embodiment of the present invention.
Figure 8:
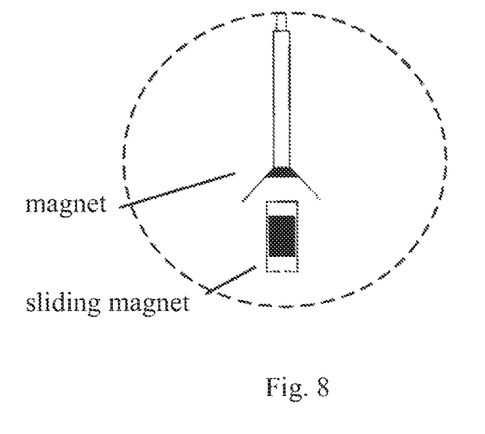
FIG. 8 is an enlarged structure schematic diagram of a magnetical switch, according to the fifth embodiment of the present invention.

FIGS. 7 and 8 are respectively enlarged structure schematic diagrams of a spring switch or a magnetical switch. In addition, FIGS. 7 and 8 are only specific examples of the spring switch and the magnetical switch, and those skilled in the art may also utilize the spring switch and the magnetical switch of other structures to implement the above solution.

In case that the trigger switch is spring switch, when the side panel of the recyclable logistics apparatus is folded, a spring member in the spring switch is not pressed such that the spring switch is opened, and when the side panel of the recyclable logistics apparatus is upright, the spring member is pressed such that the spring switch is closed.

In case that the trigger switch is magnetical switch, when the side panel of the recyclable logistics apparatus is folded, a magnetical member is not absorbed such that the magnetical switch is off, and when the side panel is upright, the magnetical member is absorbed such that the magnetical switch is closed.

Figure 9:
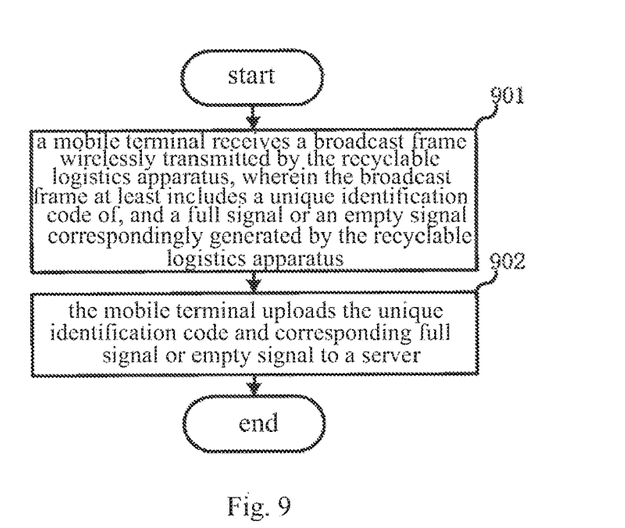
FIG. 9 is a flow diagram of a method for processing empty and full signals of recyclable logistics apparatus, according to the sixth embodiment of the present invention.

The sixth embodiment of the present invention relates to a method for processing empty and full signals of recyclable logistics apparatus, and FIG. 9 is a flow diagram of the method for processing empty and full signals of recyclable logistics apparatus.

Specifically, as shown in FIG. 9, the method for processing empty and full signals of recyclable logistics apparatus comprises the following steps:

At step 901, a mobile terminal receives a broadcast frame wirelessly transmitted by the recyclable logistics apparatus, wherein the broadcast frame at least includes a unique identification code of the recyclable logistics apparatus and a full signal or an empty signal correspondingly generated by the recyclable logistics apparatus.

Then proceeds to step 902, the mobile terminal uploads the unique identification code and corresponding full signal or empty signal to a server.

Then ends the flow.

Wherein, the mobile terminal is the mobile terminal utilized by a supplier of the recyclable logistics apparatus for uploading the empty and full state of the recyclable logistics apparatus to the server. In addition, the mobile terminal utilized by a transporter or a user may query the empty and full state of the recyclable logistics apparatus uploaded by the mobile terminal of the supplier.

Preferably, the broadcast frame further includes a signal of the type of the recyclable logistics apparatus. The type of recyclable logistics apparatus includes the apparatus containing liquid or solid classified in terms of the usage of the apparatus, or classification of the apparatus in terms of the loading capacity of the apparatus.

Figure 10:
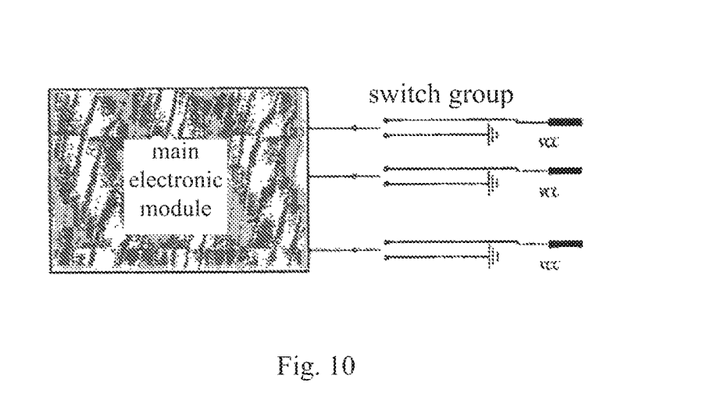
FIG. 10 is a special jumper circuit diagram of a special box of recyclable logistics apparatus, according to the sixth embodiment of the present invention.

Preferably, the signal of the type of recyclable logistics apparatus is determined by a preset jumper. FIG. 10 illustrates a special jumper circuit diagram of a special box of recyclable logistics apparatus, as shown in the figure, a main electronic module is equipped with a switch group which can choose how to weld, and is encoded and welded according to the type of the apparatus before leaving the factory. The main electronic module respectively set identification bits of the type signal in the broadcast frame according to the read switch information. It can be understood that, in other embodiments of the present invention, various types may also be encoded in software form.

Figure 11:
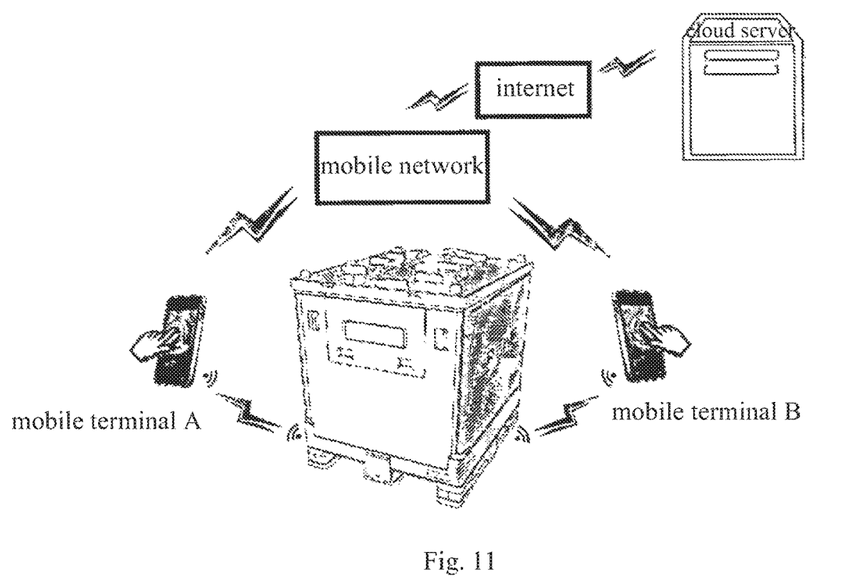
FIG. 11 is a schematic diagram of an application scenario for an information transmission method of recyclable logistics apparatus, according to the sixth embodiment of the present invention.

FIG. 11 illustrates a schematic diagram of an application scenario for an information transmission method of recyclable logistics apparatus.

As shown in FIG. 11, the recyclable logistics apparatus transmits information using the above method for processing empty and full signals, and the recyclable logistics apparatus periodically and wirelessly transmits a broadcast frame through the wireless beacon unit, the broadcast frame at least includes a unique identification code of the wireless beacon unit and an empty or full signal of the recyclable logistics apparatus; mobile terminal A or mobile terminal B receives the broadcast frame, and uploads the received unique identification code of the wireless beacon unit and corresponding empty or full signal to a cloud server; the mobile terminal B may obtain using state of respective recyclable logistics apparatus through the cloud server. Preferably, a terminal is, for example, a mobile phone, a tablet computer, a notebook computer, a personal digital assistant (PDA) etc.

The present embodiment may reflect empty and full states of respective recyclable logistics apparatuses accurately and in batch, and facilitate uploading information of respective logistics apparatuses by a mobile terminal, such that it is convenient for a management center to deploy and manage. It is also convenient for a user to obtain the empty and full states of the desired type of apparatuses at a mobile terminal.

The method embodiments of the present invention all can be realized by software, hardware and firmware etc. Regardless of the present invention is realized by software, or hardware, or firmware, instruction codes can be stored in any type of computer accessible memory (such as permanent or can be modified, volatile or non-volatile, solid-state or non solid, fixed or replaceable medium etc.). Similarly, the memory can be, for example, programmable array logic (PAL), random access memory (RAM), programmable read only memory (PROM), read-only memory (ROM), electrically erasable programmable ROM (EEPROM), floppy disc, optical disc, and digital versatile disc (DVD) etc.

Figure 12:
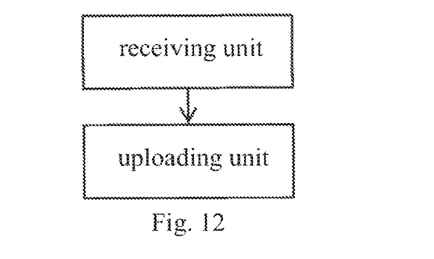
FIG. 12 is a structure schematic diagram of a system for processing empty and full signals of recyclable logistics apparatus, according to the seventh embodiment of the present invention.

The seventh embodiment of the present invention relates to a system for processing empty and full signals of recyclable logistics apparatus, and FIG. 12 is a structure schematic diagram of the system for processing empty and full signals of the recyclable logistics apparatus.

Specifically, as shown in FIG. 12, the system for processing empty and full signals of the recyclable logistics apparatus comprises the following units:

a receiving unit configured to control a mobile terminal to receive a broadcast frame wirelessly transmitted by the recyclable logistics apparatus of first to fifth embodiments, wherein the broadcast frame at least includes a unique identification code of the recyclable logistics apparatus and a full signal or an empty signal correspondingly generated by the recyclable logistics apparatus;

an uploading unit configured to control the mobile terminal to upload the unique identification code and corresponding full signal or empty signal to a server.

Preferably, the broadcast frame received by the mobile terminal controlled by the receiving unit further includes a signal of the type of the recyclable logistics apparatus.

The sixth embodiment is the method embodiment corresponding to this embodiment, and this embodiment and the sixth embodiment can be implemented in cooperation with each other. Correlated technical details disclosed in the sixth embodiment are still effective in this embodiment and will not be repeated here in order to reduce duplication. Correspondingly, correlated technical details disclosed in this embodiment can also be applied in the sixth embodiment.

In view of the above, the advantages of the present application mainly lie in:

1. The workload and time for performing statistics about using states of recyclable logistics apparatuses are significantly reduced.

2. The operator is allowed to remotely obtain information of a plurality of logistics apparatuses located in other places.

3. The reliability and accuracy of information are improved.

It should be noted that units disclosed in each device embodiment of the present invention are logical units, on the physical, a logic unit can be a physical unit, and may be part of a physical unit, or implemented in combination of several physical units, and physical implementing methods for these logic units themselves are not the most important, the combination of the functions achieved by these logic units is the key to solving the technical problem disclosed in the present invention. Furthermore, in order to highlight innovative part of the present invention, the above device embodiments of the present invention do not introduce the units which are not related closely to solving the technical problem disclosed in the present invention, which does not indicate that the above device embodiments do not include other units.

It should be explained that in the Claims and Description of the present invention, relationship terms such as first, second etc are just utilized to distinguish one entity or manipulation from another entity or manipulation, instead of requiring or indicating any practical relation or sequence existing between these entities or manipulations. And, the terms "include", "comprise" or any other variant indicate to nonexclusive covering, thus the process, method, article or equipment including a series of elements not only includes those elements, but also includes other elements which are not definitely listed, or inherent elements of this process, method, article or equipment. Without more limitations, the element defined by the phrase "include a" does not exclude additional same elements existing in the process, method, article or equipment of this element.

By referring to some preferred embodiments of this invention, this invention has been illustrated and described. But it should be understood to those skilled in the art that various other changes in the forms and details may be made without departing from the principles and scope of the invention.

What is claimed is:

1. A recyclable logistics apparatus providing a signal indicative of a full state and a signal indicative of an empty state, wherein, the recyclable logistics apparatus at least comprises a bottom, a top cover, four side panels including a side panel which is connected to the bottom and foldable, and a wireless beacon unit for transmitting a broadcast frame outwards;

when the recyclable logistics apparatus is folded, a main surface of the top cover, a main surface of the side panel and a main surface of the bottom are in parallel to each other: wherein the top cover is disposed on top of the side panel and the side panel is disposed on top of the bottom:

a trigger switch is provided on the bottom, the top cover or the side panel;

when the side panel of the recyclable logistics apparatus is folded, the trigger switch is in a first trigger state and generates a first electrical signal, and the wireless beacon unit transmits the broadcast frame including a unique identification code of the wireless beacon unit and the signal indicative of the empty state outwards according to the first electrical signal;

when the side panel of the recyclable logistics apparatus is upright, the trigger switch is in a second trigger state and generates a second electrical signal, and the wireless beacon unit transmits the broadcast frame including the unique identification code of the wireless beacon unit and the signal indicative of the full state outwards according to the second electrical signal; and wherein when the side panel is folded, a top edge of the side panel is detached from an edge of the top cover and/or a bottom edge of the side panel is detached from an edge of the bottom such that the trigger switch is opened;

when the side panel is upright, the top edge of the side panel is attached to the edge of the top cover and/or the bottom edge of the side panel is attached to the edge of the bottom such that the trigger switch is closed.

2. The recyclable logistics apparatus according to claim 1, wherein the recyclable logistics apparatus is further provided with a wire loop;

in the wire loop, the trigger switch is connected to the wireless beacon unit via a wire;

when the side panel of the recyclable logistics apparatus is folded, the first trigger state of the trigger switch causes the wire loop to be in a first state, and the wireless beacon unit generates corresponding signal indicative of the empty state; and when the side panel of the recyclable logistics apparatus is upright, the second trigger state of the trigger switch causes the wire loop to be in a second state, and the wireless beacon unit generates corresponding signal indicative of the full state.

3. The recyclable logistics apparatus according to claim 1, wherein the wireless beacon unit transmits the broadcast frame by one of the following wireless communication means: RFID, Zigbee, Bluetooth, wifi, iBeacon.

4. A method of using the recyclable logistics apparatus of claim 1, comprising:

receiving by a first mobile terminal, the broadcast frame wirelessly transmitted by the recyclable logistics apparatus, wherein the broadcast frame at least includes the unique identification code of the recyclable logistics apparatus and the signal indicative of the full state or the signal indicative of the empty state correspondingly generated by the recyclable logistics apparatus;

uploading by the first mobile terminal, the unique identification code and corresponding signal indicative of the full state or corresponding signal indicative of the empty state to a server;

obtaining a using state of the recyclable logistics apparatus by a second mobile terminal through the server.

5. The recyclable logistics apparatus according to claim 1, wherein the trigger switch is a magnetic switch, when the side panel is upright, a magnetic member is absorbed such that the magnetic switch is closed, and when the side panel is folded, the magnetic member is not absorbed such that the magnetic switch is off.

6. The recyclable logistics apparatus according to claim 1, wherein the trigger switch includes a metal sheet and a trigger contact point, the metal sheet is disposed on the bottom and is connected to the wireless beacon unit via a wire, the trigger contact point is disposed on the side panel;

when the side panel is upright, the trigger contact point is contacted with the metal sheet, forming a circuit loop with the wireless beacon unit, such that the recyclable logistics apparatus transmits the signal indicative of the full state; and when the side panel is folded, the trigger contact point is disconnected from the metal sheet, breaking the circuit loop, such that the recyclable logistics apparatus transmits the signal indicative of the empty state.

7. The recyclable logistics apparatus according to claim 1, wherein the trigger switch is a spring switch, when the side panel is upright, a spring member in the spring switch is pressed such that the spring switch is closed; and when the side panel is folded, the spring member in the spring switch is not pressed such that the spring switch is opened.

8. The recyclable logistics apparatus according to claim 1, wherein the broadcast frame includes a signal of a type of the recyclable logistics apparatus, the recyclable logistics apparatus further comprises a switch group, the switch group is encoded and welded based on the type of the recyclable logistics apparatus during manufacturing, the wireless beacon unit respectively sets identification bits of the signal of the type in the broadcast frame according to switch information obtained from the switch group.

* * * * *